United States Patent [19]

Franke

[11] 3,917,755

[45] *Nov. 4, 1975

[54] PRODUCTION OF S-AMMONIUM PHOSPHORIC ACID ESTERS AND THIOLO-PHOSPHORIC ACID ESTERS FROM THIONO-PHOSPHORIC ACID ESTERS

[75] Inventor: Hans G. Franke, Orinda, Calif.

[73] Assignee: Chevron Research Company, San Francisco, Calif.

[ * ] Notice: The portion of the term of this patent subsequent to Aug. 13, 1991, has been disclaimed.

[22] Filed: Sept. 24, 1973

[21] Appl. No.: 400,288

Related U.S. Application Data

[63] Continuation-in-part of Ser. No. 317,479, Dec. 21, 1972, Pat. No. 3,832,425.

[52] U.S. Cl. .............. 260/987; 260/978; 260/979
[51] Int. Cl.$^2$.................... C07F 9/24; C07F 9/165
[58] Field of Search ................................ 260/987

[56] References Cited
UNITED STATES PATENTS 3,832,425  8/1974  Franke ...................... 260/987 X

*Primary Examiner*—Anton H. Sutto
*Attorney, Agent, or Firm*—J. A. Buchanan, Jr.; John Stoner, Jr.; Raymond Owyang

[57] ABSTRACT

The sulfur moiety of a thiono-phosphoric acid ester is converted to the S-ammonium salt by reacting the thionophosphoric acid ester with an ammonium sulfide or polysulfide. The S-ammonium salt may be alkylated to produce the thiolophosphoric acid ester.

7 Claims, No Drawings

PRODUCTION OF S-AMMONIUM PHOSPHORIC ACID ESTERS AND THIOLO-PHOSPHORIC ACID ESTERS FROM THIONO-PHOSPHORIC ACID ESTERS

RELATED APPLICATION

This application is a continuation-in-part of application Ser. No. 317,479, filed Dec. 21, 1972, now U.S. Pat. No. 3,832,425.

BACKGROUND OF THE INVENTION

The sulfur-containing derivatives of orthophosphoric acid esters exist in two isomeric forms (I, thiono, and II, thiolo).

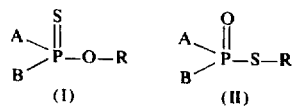

wherein A, B and R represent organo groups. Cheymol, Chabrier, Thuong, Rioult and Goyer, Med. Pharmacol. exp. 14, 305–310 (1966), disclose that the thiolo form of certain orthophosphoric acid ester insecticides (e.g., isodimethoate, isomalathion and isosumithion) generally show more lethality and enzyme-inhibiting power than the corresponding thiono form. A process for converting the thiono form of an orthophosphoric acid ester to the thiolo form would therefore be useful for producing more active insecticides.

SUMMARY OF THE INVENTION

It has now been found that the thiono form of a phosphoric acid ester can be converted to the thiolo form by: (1) reacting a thiono-phosphoric acid ester with ammonium sulfide or polysulfide to form an S-ammonium salt; and (2) alkylating the S-ammonium salt to form the sulfur ester (thiolo form) of the phosphoric acid ester.

DESCRIPTION OF THE INVENTION

The process of the invention may be illustrated by the following equations:

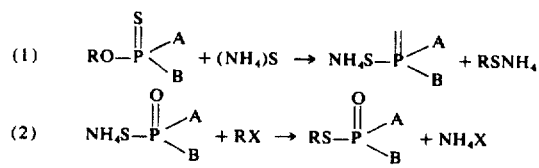

wherein A, B and R represent organo groups and RX represents an alkylating agent, e.g., methyl iodide.

In general, the process of the invention is suitable for the conversion of any thiono-phosphoric acid ester compound to a thiolo-phosphoric acid ester. The term "thiono-phosphoric acid ester," as employed in this specification, means a pentavalent phosphorus acid ester having the following partial structure:

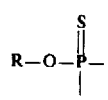

wherein R is an organo group and the dangling valences are satisfied by suitable organo group(s) or amino. The term "thiolophosphoric acid" therefore refers to the corresponding sulfur ester, i.e.,

Examples of suitable thiono-phosphoric acid ester reactants are tabulated in Table I. All of the thiono-phosphoric acid esters are known, and most are disclosed in Chemical Week, June 21, 1972, pp. 34–66, and July 26, 1972, pp. 18–46.

TABLE I

O,O,O',O'-tetramethyl-O,O'-thiodi-p-phenylenephosphorothioate 2-(O,O-diethylthionophosphoryl)-5-methyl-6-carbethoxypyrazolo-(1,5a)-pyrimidine O-[2-chloro-1-(2,5-dichlorophenyl)-vinyl]-O,O-diethylphosphorothioate O,O,O,O-tetrapropyldithiopyrophosphate S-(O,O-diisopropylphosphorodithioate) ester of N-(2-mercaptoethyl)benzenesulfonamide O,O-diethyl-O-3-chloro-4-methyl-2-oxo-2H-1-benzopyran-7-yl-phosphorothioate O-p-cyanophenyl-O,O-dimethylphosphorothioate O,O-diethyl-O-(2-isopropyl-6-methyl-4-pyrimidinyl)-phosphorothioate O,O-dimethyl-S-(N-methylcarbamoylmethyl)-phosphorodithioate 2,3-p-dioxanedithiol-S,S-bis-(O,O-diethylphosphorodithioate)

O,O-diethyl-S-[2-(ethylthio)-ethyl]-phosphorodithioate

O,O-diethyl-O-(3,5,6-trichloro-2-pyridyl)-phosphorothioate

O-ethyl-S-phenyl-ethylphosphonodithioate

O-ethyl-O-p-nitrophenylphenylphosphonothioate

O,O,O',O'-tetraethyl-S-S'-methylenebisphosphorodithioate

O,O-dimethyl-O-[4-methylthio)-m-tolyl]-phosphorothioate

O,O-diethyl-O-[p-(methylsulfinyl)-phenyl]-phosphorothioate

O,O-bis-(p-chlorophenyl)-acetimidoylphosphoramidothioate

O,O-diethyl-s-[4-oxo-1,2,3-benzotriazin-3-(4H)-ylmethyl]phosphorodithioate 1-phenyl-3-(O,O-diethylthionophosphoryl)-1,2,4-triazol.

N-(mercaptomethyl)phthalimide-S-(O,O-dimethylphosphorodithioate

O,O-dimethylphosphorodithioate of diethyl mercaptosuccinate

S-(4,6-diamino-s-triazin-2-ylmethyl)-O,O-dimethyl phosphorodithioate

O,O-dimethyl-O-p-nitrophenylphosphorothioate

O,O-diethyl-O-p-nitrophenylphosphorothioate

O,O-dimethyl-S-(α-ethoxycarbonylbenzyl)phosphorodithioate

O,O-diethyl-S-(ethylthio)-methylphosphorodithioate

O-(4-bromo-2,5-dichlorophenyl)-O-methylphenyl-phosphonothioate 2-diethylamino-6-methylpyrimidin-4-yl-diethylphosphorothioate O,O-dimethyl-O-(2,4,5-trichlorophenyl)phosphorothioate
2-methoxy-4H-1,3,2-benzodioxaphosphorin-2-sulfide
O,O-dimethyl-O-(4-nitro-m-tolyl)-phosphorothioate
O,O-dimethyl-S-(2-methoxy-1,3,4-thiadiazol-5-(4H)-onyl-4-methylphosphorodithioate
O-p-cyanophenyl-O-ethylphenylphosphonothioate
O,O-diethyl-O-[2-(ethylthio)-ethyl] phosphorothioate
S-(2-chloro-1-phthalimido-ethyl)-O,O-diethylphosphorodithioate
S-[{(p-chlorophenyl)thio}methyl]-O,O-diethylphosphorodithioate
O-2,4-dichlorophenyl-O,O-diethylphosphorothioate
O,O-diethyl-O-(2-pyrazinyl)phosphorothioate
O,O-diethyl-S-[(6-chloro-2-oxobenzoxazolin-3-yl)-methyl]phosphorodithioate
O,O-dimethyl-S-2-(acetylaminoethyl)phosphorodithioate
O,O-dimethyl-S-(2-methoxyethylcarbamoylmethyl)-phosphorodithioate
Bis(dialkylphosphinothioyl) disulfide
O,O-diethyl-O-2,4-dichlorophenylphosphorothioate
O,O-dimethylphosphoroamidothioate
O-methyl-O-(4-chloro-2-nitrophenyl)-N-isopropyl-phosphoroamidothioate
O-ethyl-O-(4-methylthiophenyl)-S-(2-phenylethyl)-phosphorodithioate
O,O-dimethyl-S-(2-ethylthioethyl)phosphorodithioate
O,O-dimethyl-S-(2-phenylethyl)phosphorodithioate
O,O-dimethyl-S-benzylphosphorodithioate
O-methyl-N,N-di-(dimethylamino)phosphoroamidothioate Two preferred classes of thiono-phosphoric acid ester reactants are represented by formulas (III) and (IV):

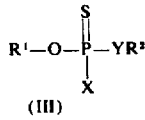 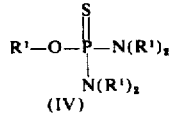

(III)  (IV)

wherein R$^1$ is lower alkyl of 1 to 6 carbon atoms or alkenyl of 3 to 6 carbon atoms, Y is oxygen or sulfur and R$^2$ is R$^1$, monocyclic aryl (phenyl, phenylalkyl or alkylphenyl) of up to 10 carbon atoms and up to 3 fluorine, chlorine, bromine, nitro, cyano, alkoxy of 1 to 4 carbon atoms, or alkylthio of 1 to 4 carbon atoms, and X is YR$^2$, amino, N-alkylamino of 1 to 6 carbon atoms, N,N-dialkylamino of 2 to 10 carbon atoms or N-alkanoylamido (i.e.,

wherein R$^3$ is alkyl of 1 to 9 carbon atoms) of 2 to 10 carbon atoms.

Representative alkyl groups which R$^1$ and R$^2$ may represent include methyl, ethyl, propyl, isopropyl, butyl, secpentyl and hexyl. Representative alkenyl groups which R$^1$ and R$^2$ may represent include allyl, 2-butenyl, 3-butenyl 2-hexenyl, 5-hexenyl, etc. Representative phenylalkyl R$^2$ groups are benzyl, 2-phenylethyl, 3-(o-tolyl)propyl, 4-phenylhexyl, 6-(o-tolyl)hexyl, etc. Representative alkylphenyl R$^2$ groups are o-tolyl, p-tolyl, 2,4-dimethylphenyl, 3,5-diisopropylphenyl, 4-t-butyl-phenyl, etc. Representative substituted-aryl R$^2$ groups include 2-fluorophenyl, 4-chlorophenyl, 2,4-dichlorophenyl, 4-nitrophenyl, 3-methyl-4-nitrophenyl, 3-methoxyphenyl, 4-cyanophenyl, 2-methylthiophenyl, 4-chlorobenzyl, 2-chloro-4-methylphenyl, etc. Representative X groups wherein X is YR$^2$ are methoxy, methylthio, 2-propenyloxy, phenoxy, phenylthio, 4-chlorophenoxy, benzyloxy, benzylthio, 2-nitro-4-methylphenoxy, 3-methoxy-4-chloro-2-tolylthio, etc. Representative N-alkylamino X groups are methylamino, ethylamino, n-propylamino and isopropylamino, and representative N,N-dialkylamino X groups are dimethylamino, diethylamino and methylethylamino. Representative N-alkanoylamido X groups are N-acetylamido, N-propionylamido, N-hexanoylamido, etc.

The preferred R$^1$ groups are alkyl, especially methyl or ethyl. The preferred Y group is oxygen, and the preferred R$^2$ groups are alkyl. The preferred X groups are YR$^2$ wherein R$^2$ is phenyl or phenyl substituted with halogens, nitro, cyano, alkoxy of 1 to 4 carbon atoms or alkylthio of 1 to 4 carbon atoms, and amino, N-alkylamino and N,N-dialkylamino. The most preferred X groups are amino, N-alkylamino and N,N-dialkylamino.

As defined in this specification, thiono-phosphoric acid esters may have one O-ester moiety, e.g.,

two O-ester moieties, e.g.,

or three O-ester moieties, e.g.,

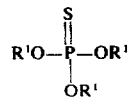

If the thiono-phosphoric acid ester contains two or three O-ester moieties, then during reaction of the thiono-phosphoric acid ester with ammonium sulfide or polysulfide the oxygen atom of any one of the O-ester moieties may be converted to the oxygen atom double-bonded to phosphorus (i.e., the P=O oxygen). However, a P-O-alkyl ester moiety is generally preferentially converted to the P=O oxygen, unless the organo group bonded to the oxygen atom (e.g., R$^1$) is a moiety which forms a relatively stable carbonium ion, e.g., $CH_3CH_2=CH_2^+$ or $C_6H_5CH_2^+$.

Ammonium sulfide and polysulfide, e.g. $(NH_4)_2S_x$, wherein X is 1 to 5, of reasonable purity, are suitably employed for the preparation of the S-ammonium salt. Commercially available aqueous solutions of ammonium sulfide or polysulfide are particularly suitable for use.

The reaction of the ammonium sulfide or polysulfide with the thiono-phosphoric acid ester is conducted in the liquid phase in the presence or absence of an inert solvent which is liquid at reaction temperature and pressure. Suitable organic solvents include oxygenated hydrocarbons such as alkanols of 1 to 6 carbon atoms, e.g., methanol, ethanol, isopropanol, butanol, hexanol, etc.; dialkyl ketones of up to 8 carbon atoms, e.g., acetone, methyl ethyl ketone, etc., acyclic alkyl ethers, e.g., dimethyl ether, dibutyl ether dimethoxyethane, diethylene glycol dimethyl ether, etc.; and cycloalkyl ethers, e.g., dioxane, tetrahydrofuan and tetrahydropyran. Other suitable organic solvents include nitriles such as acetonitrile and propionitrile; and dialkylamides such as dimethylformamide; dialkylsulfoxides such as dimethylsulfoxide. Still other suitable solvents comprise water or water containing a portion of a polar organic cosolvent. Suitable mixtures of water and a polar organic cosolvent vary by volume, from about 20 percent cosolvent to 80 percent cosolvent and from about 20 percent water to 80 percent water. Solvents are used in quantities sufficient to form a slurry of the reactants or a substantially liquid phase solution. Generally, up to 100 mols of solvent per mol of the thionophosphoric acid ester is employed. The reaction is preferably conducted in the presence of a solvent, and the preferred solvent is water or a mixture of water and a polar organic solvent.

The temperature of the reaction may vary from about 10° to 100°C., preferably from 25° to 75°C. Pressure is not critical, as long as the reaction mixture is maintained substantially in a non-gaseous phase. Typical pressures vary from 1 to 10 atomospheres. The time of reaction varies with the temperature. In general, the reaction is complete within 10 hours, more usually within 5 hours or less.

The molar ratio of ammonium sulfide or polysulfide to thiono-phosphoric acid ester varies from about 1:2 to 10:1, preferably from about 1:2 to 2:1.

The preparation of the S-ammonium salts produce as by-products hydrocarbyl mercaptans, dihydrocarbyl sulfides and/or dihydrocarbyl polysulfides, e.g., $R^1SH$, $R^1SR^1$ or $R^1SSR^1$, wherein $R^1$ has the same significance as previously defined. It has been found that the additional presence of sulfur and/or ammonia as reaction components results in the formation of principally dihydrocarbyl disulfide by-products. When sulfur or ammonia is employed, the molar ratio of sulfur (or ammonia) to ammonium sulfide or polysulfide varies from about 5:1 to 1:5, preferably from about 2:1 to 1:2.

The precise method of contacting the reactants employed in the preparation of the S-ammonium salt is not critical. In the preferred modification, the sulfide or polysulfide, the thiono-phosphoric acid ester and solvent (and sulfur or ammonia, if any) are maintained with agitation at reaction temperature and pressure for the desired reaction period. The S-ammonium salt of the phosphoric acid ester is sometimes soluble in the reaction medium and may be used for further reactions without separation. However, the product usually precipitates upon standing as a solid crystalline material which may be collected by filtration, centrifugation or decantation. The solid product can be purified by washing with a liquid or by crystallization from an appropriate solvent, such as acetone, ethanol, etc.

As depicted in equation (2), ammonium salts of the phosphoric-acid ester are converted to thiolo-phosphoric acid esters by reacting the ammonium salt with an alkylating agent. Suitable alkylating agents include the alkyl, alkenyl and aralkyl halides of up to 10 carbon atoms, such as methyl iodide, ethyl bromide, allyl chloride, hexyl bromide, crotyl chloride, benzyl chloride, propargyl bromide, isopropyl iodide, etc.; the dialkyl and dialkenyl sulfates of up to 10 carbon atoms, such as dimethyl sulfate, diethyl sulfate, diallylsulfates, etc; and the alkyl and alkenyl aryl- or alkenesulfonates, such as methyl p-tolune sulfonate, ethyl 2,4-xylenesulfonate, allyl p-toluene sulfonate, methyl methanesulfonate, allyl methanesulfonate, etc. Other suitable alkylating agents include haloalkanoates of up to 10 carbon atoms such as methyl bromoacetate, ethyl-4-bromobutyrate, etc. The preferred alkylating agents are alkyl halides, alkenyl halides and dialkyl sulfates.

Alkylation is effected by conventional procedures, e.g., as by reacting ammonium salts of the phosphoric acid ester and the alkylating agent in an inert solvent or an excess of liquid alkylating agent at temperatures in the range 0°–80°., preferably 25°–60°C. Suitable solvents are the halogenated hydrocarbons such as dichloromethane, chloroform, tetrachloroethane, or acetonitrile, acetone, methanol, etc. The preferred solvent is water.

EXAMPLES

EXAMPLE 1

Preparation of S-ammonium-O-methyl-phosphoroamidothioate

A mixture of 35.3 g (0.25 mol) O,O-dimethylphosphoroamidothioate and 69.3 g (0.2 mol $[NH_4]_2S$) of 20 weight percent aqueous ammonium sulfide was heated at 60°C. for 2 hours. The resulting yellow solution was evaporated under reduced pressure to give a yellow oil. The oil was diluted with a little dimethylformamide. After standing for several hours at about 25°C., the oil crystallized to give the crude ammonium-salt product. The ammonium salt was filtered, washed with acetonitrile and dimethyl ether, and dried under vacuum over phosphorus pentoxide. A 73% yield of the ammonium salt was obtained. The nuclear magnetic resonance spectrum showed a 3-proton doublet at 3.38$\delta$, J = 14 Hz, ($-OCH_3$), and a 6-proton multiplet at 4.48$\delta$ ($-NH$).

EXAMPLE 2

Preparation of O,S-dimethylphosphorodithioate of diethyl mercaptosuccinate (isomalathion)

A mixture of 34.7 g O,O-dimethylphosphorodithioate of diethyl mercaptosuccinate (malathion), 9.95 g of 53 percent aqueous ammonium sulfide, 2.4 g sulfur flowers and 40 ml water was maintained at 50°C. for 2½ hours under an atmosphere of nitrogen. The resulting solution was placed in a cold-water bath. A 14.4 sample of dimethyl sulfate was then added to the solution over a half-hour period. The organic phase of the reaction mixture was separated, washed with water, dried with magnesium sulfate and evaporated under reduced pressure to give the isomalathion product. The nuclear magnetic resonance spectrum showed the $-SCH_3$ group as a doublet at 2.38$\delta$, J = 15 Hz, and the $-OCH_3$ group as a doublet at 3.80$\delta$, J = 13 Hz.

EXAMPLE 3

Preparation of S-ammonium-O-methyl-N-acetylphosphoroamidothioate

A mixture of 0.046 mol O,O-dimethyl-N-acetylphosphoroamidothioate, 0.05 mol ammonium sulfide and 0.7 mol water was heated at 55°C. for 3 hours. The reaction mixture was evaporated at low temperature under reduced pressure to give the crude ammonium salt product. The ammonium salt was then purified by washing with acetonitrile. The salt had a melting point greater than 220°C. and a nuclear magnetic resonance spectrum having a doublet at 3.55δ, J = 13 Hz (—OCH₃), and a doublet at 2.06δ, J = 1 Hz (—CH₃)

EXAMPLE 4

Preparation of S-methyl-O-methyl-N-acetylphosphoroamidothioate

S-ammonium-O-methyl-N-acetylphosphoroamidothioate was prepared by a procedure similar to that of Example 3, except that the ammonium salt was not isolated. Instead, the ammonium salt-containing reaction mixture was acidified with sulfuric acid to pH 5.4 and then reacted with 0.26 mol of dimethyl sulfate for 3 hours at 15°–30°C. The resulting reaction mixture was neutralized (pH 7) with ammonium hydroxide and then was continuously extracted with methylene dichloride. Evaporation of the methylene dichloride extracts gave a 93.6 percent yield of S-methyl-O-methyl-N-acetylphosphoroamidothioate, m.p. 82°–85°C. (a commercial insecticide marketed under the trade name OR-THENE Insecticide).

EXAMPLE 5

Preparation of S-ammonium-O-methyl-N-acetylphosphoroamidothioate

A mixture of 0.744 mol O,O-dimethyl-N-acetylphosphoroamidothioate, 0.744 mol ammonium polysulfide [(NH₄)₂S$_x$ wherein X is 1 to 5] and 11.3 mols water was heated at 60°C. for 2 hours. The reaction mixture was evaporated at low temperature under reduced pressure to give the ammonium salt. The salt was then purified by washing with acetonitrile. The melting point of the salt was greater than 220°C.

EXAMPLE 6

Preparation of S-ammonium-O-methyl-N-isopropylphosphoroamidothioate

A mixture of 18.3 g (0.1 mol) O,O-dimethyl-N-isopropylphosphoroamidothioate, 13.1 g (0.1 mol [NH₄]₂S) of 52 percent aqueous ammonium sulfide, 30 ml water and 72 ml ethanol was heated for about 3 hours. On standing overnight, unreacted starting material crystallized from the reaction mixture. The reaction mixture was filtered and the filtrate was evaporated to give an aqueous slurry. The slurry was filtered, and the aqueous filtrate was evaporated under reduced pressure to give the crude ammonium salt product. The salt was purified by washing with acetonitrile and dried. The nuclear magnetic resonance spectrum showed a 3-proton doublet at 3.38δ, J = 13 Hz, (—OCH₃), a 1-proton singlet at 4.52 (—NH—), a 1-proton multiplet at 3.15δ (—CH—), and a 6-proton doublet at 1.0δ, J = 5 Hz, (—CH₃).

What is claimed is:

1. A process for preparing S-ammonium salts of thiono-phosphoric acid esters which comprises reacting a thiono-phosphoric acid ester of the formula

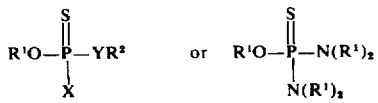

wherein R¹ is alkyl of 1 to 6 carbon atoms or alkenyl of 3 to 6 carbon atoms, Y is oxygen or sulfur, R² is alkyl or 1 to 6 carbon atoms or alkenyl of 3 to 6 carbon atoms and X is amino, N-alkylamino of 1 to 6 carbon atoms, N,N-dialkylamino of 2 to 10 carbon atoms or N-alkanoylamino of 2 to 10 carbon atoms, which comprises reacting said ester with an ammonium sulfide or polysulfide in liquid phase at a temperature from about 10°C. to 100°C.

2. The process of claim 1 wherein the thiono-phosphoric acid ester is O,O-dimethylphosphoroamidothioate.

3. The process of claim 1 wherein the process is conducted in aqueous solution.

4. The process of claim 1 wherein 0.2 to 5 mols of sulfur per mol of sulfide or polysulfide is employed as an additional reactant.

5. A process for preparing the S-ammonium salt of malathion which comprises reacting malathion with an ammonium sulfide or polysulfide in liquid phase at a temperature from about 10°C. to 100°C.

6. The process of claim 5 wherein the process is conducted in aqueous solution.

7. The process of claim 5 wherein 0.2 to 5 mols of sulfur per mol of sulfide or polysulfide is employed as an additional reactant.

* * * * *